United States Patent [19]
Srisuresh et al.

[11] Patent Number: 6,058,431
[45] Date of Patent: May 2, 2000

[54] SYSTEM AND METHOD FOR NETWORK ADDRESS TRANSLATION AS AN EXTERNAL SERVICE IN THE ACCESS SERVER OF A SERVICE PROVIDER

[75] Inventors: Pyda Srisuresh, Milpitas; Steven M. Willens, Pleasanton, both of Calif.

[73] Assignee: Lucent Technologies Remote Access Business Unit, Pleasanton, Calif.

[21] Appl. No.: 09/064,739

[22] Filed: Apr. 23, 1998

[51] Int. Cl.⁷ .................................................. G06F 13/00
[52] U.S. Cl. ........................... 709/245; 709/225; 709/238
[58] Field of Search ..................................... 709/220, 223, 709/224, 225, 230, 238, 245, 249, 250; 370/401, 409, 901

[56] References Cited

U.S. PATENT DOCUMENTS

| | | | |
|---|---|---|---|
| 5,371,852 | 12/1994 | Attanasio et al. | 395/200 |
| 5,636,216 | 6/1997 | Fox et al. | 370/402 |
| 5,793,763 | 8/1998 | Mayes et al. | 370/389 |
| 5,815,664 | 9/1998 | Asano | 709/227 |

OTHER PUBLICATIONS

Tsuchiya, P.F. and Eng, T., "Extending the IP Internet Through Address Reuse," *Computer Communications Review*, Jan. 1, 1993, pp. 16–33.

Yeom, H.Y. et al., "IP Multiplexing by Transparent Port–Address Translator," *Proc. Of the Systems Administration Conference*, LISA, Sep. 29, 1996, pp. 113–121.

Postel, J., "Internet Control Message Protocol: DARPA Internet Program Protocol Specification", Sep. 1981, Downloaded from *ftp://ftp.isi.edu/in–notes/rfc792.txt*.

Postel, J., "User Datagram Protocol", Aug. 28, 1980, Downloaded from *ftp://ftp.isi.edu/in–notes/rfc768.txt*.

Postel, J., and J. Reynolds, "File Transfer Protocol (FTP)", Oct. 1985, Downloaded from *ftp://ftp.isi.edu/in–notes/rfc959.txt*.

Rekhter, Y., et al., "Address Allocation for Private Internets", Feb. 1996, Downloaded from *ftp://ftp.isi.edu/in–notes/rfc1918.txt*.

"Requirements for Internet Hosts—Application and Support", ed. R. Braden, Oct. 1989, Downloaded from *ftp://ftp.isi.edu/in–notes/frc1123.txt*.

"Requirements for Internet Hosts—Communication Layers", ed. R. Braden, Oct. 1989, Downloaded from *ftp://ftp.isi.edu/in–notes/rfc1122.txt*.

"Requirements for IP Version 4 Routers", ed. F. Baker, Jun. 1995 Downloaded from *ftp://ftp.isi.edu/in–notes/rfc1812.txt*.

Srisuresh, P. and K. Egevang, "The IP Network Address Translator", Sep. 1997, Downloaded from *http://ds.internic.net/internet–drafts/draft–rfced–info–srisuresh–03.txt*.

(List continued on next page.)

*Primary Examiner*—Viet D. Vu
*Attorney, Agent, or Firm*—Sterne, Kessler, Goldstein & Fox P.L.L.C.

[57] ABSTRACT

A system and method provides network address translation as an external service for private networks. Given the fact that local office networks (i.e., stub networks) are typically assigned only one globally unique IP address (or a small set of addresses), the invention presents a novel service provider access server (e.g., router) which performs basic network address translation (NAT) and network address port translation (NAPT) for such networks. The system allows NAT and NAPT features to be removed from stub network routers, thereby significantly reducing the cost of Internet infrastructure to individual companies and organizations. NAT features on service provider's access servers provide the ability for multiple hosts in disparate private (unregistered) networks to utilize the services of a service provider, using a single global address for each private network and allow private networks to avoid renumbering with access to each new service provider.

12 Claims, 7 Drawing Sheets

OTHER PUBLICATIONS

Srisuresh, P. and Der–hwa Ghen, "Load Sharing using IP Network Address Translation (LSNAT)" Feb. 1998, Downloaded from *http://ds.internic.net/internet–drafts/draft–srisuuresh–lsnat–01.txt*.

"Transmission Control Protocol DARPA Internet Program Protocol Specification", prepared by the Information Sciences Institute of University of Southern California, Sep. 1981, Downloaded from *ftp://ftp.isi.edu/in–notes/rfc793.txt*.

Tsirtsis, G. and P. Srisuresh, "Network Address Translation—Protocol Translation (NAT–PT)", Mar. 1998, Downloaded from *http://ds.internic.net/internet–drafts/draft–ietf–ngtrans–natpt–01.txt*.

SYSTEM AND METHOD FOR NETWORK ADDRESS TRANSLATION AS AN EXTERNAL SERVICE IN THE ACCESS SERVER OF A SERVICE PROVIDER

BACKGROUND OF THE INVENTION

1. Field of the Invention

The present invention relates generally to computer network connections to the Internet and more particularly to a system and method for network address translation within an access server of a service provider.

2. Related Art

Today, it is not uncommon for each employee of a company or organization to have their own workstation for performing daily tasks such as word processing, creating spreadsheets, browsing the World Wide Web (WWW) and sending electronic mail via the Internet. Companies and organizations must employ local computer networks to link these individual workstations for electronic mail communications, Internet access, and sharing data and resources (e.g., peripherals). These networks, for a medium to large size company or organization, can easily contain over hundreds (if not thousands) of workstations.

Consequently, there has been a dramatic (exponential) increase in the number of computers connected to the Internet and the WWW over the past several years. As is well known in the relevant art, the Internet is a three level hierarchy composed of backbone networks (e.g. ARPANET, NSFNET, MILNET), mid-level networks, and stub networks. These networks include commercial (.com or .co), university (.ac or .edu) and other research networks (.org, .net) and military (.mil) networks and span many different physical networks around the world with various protocols including the Internet Protocol (IP).

In order for companies and organizations to access the Internet and the WWW, their local (stub) networks must be connected, via a router, to one of the hundred or so service providers. A router is a dedicated computer platform whose sole function is to forward packets (i.e., units of transmitted data) between networks.

Figure 1:
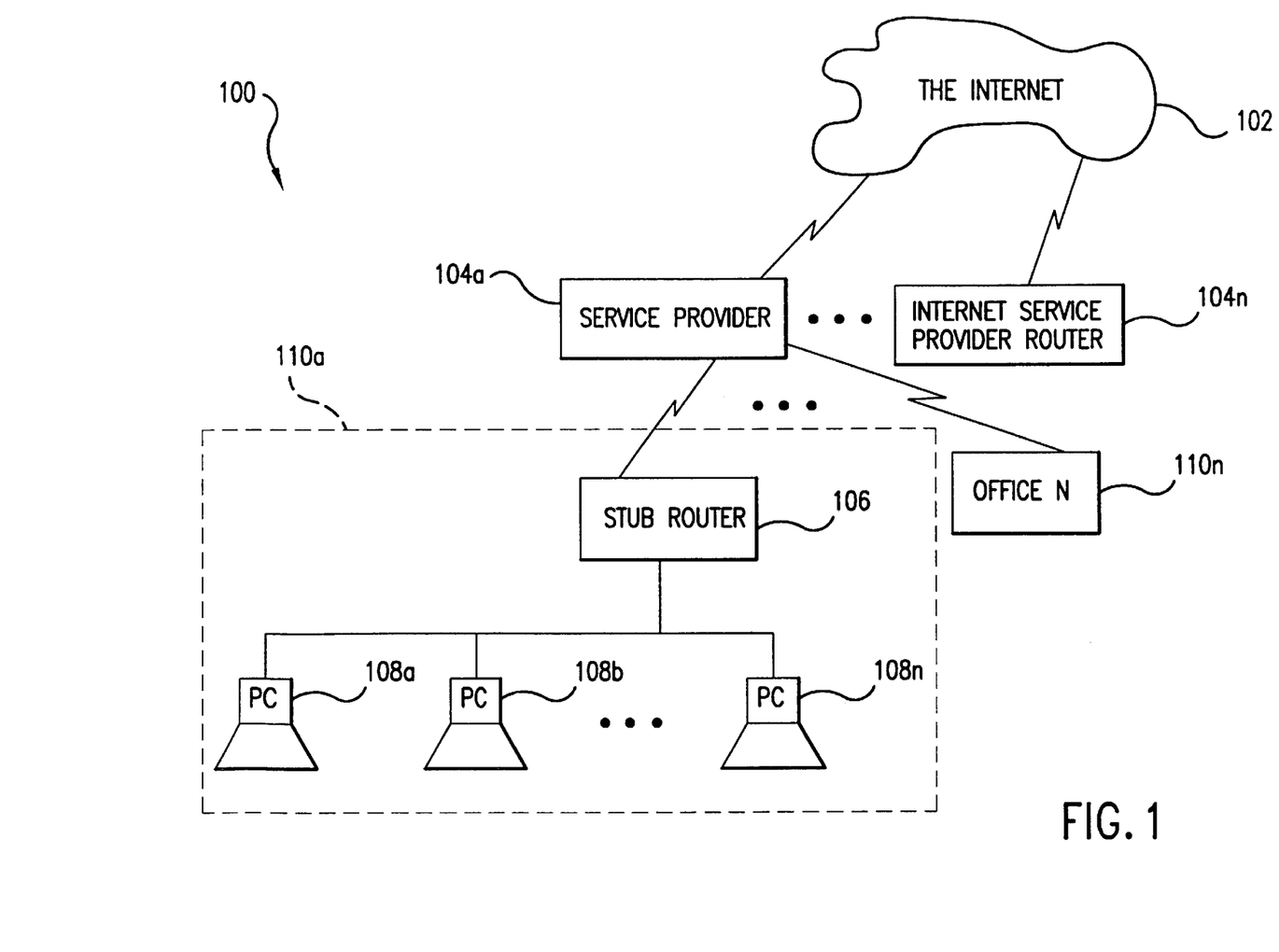
FIG. 1 is a block diagram of a computing environment typically found within the Internet.

FIG. 1 illustrates a computing environment 100 where a plurality of service providers 104a–n offer access to the Internet 102 via connections (e.g., T-1 lines) to individual offices 110 (i.e., stub networks 110a–110n). The stub networks 110 each include a stub router 106 which connects to a plurality of workstations (e.g., personal computers or the like) 108a–n.

The Internet Protocol uses an address within computing environment 100 to distinguish among the millions of computers connected to the Internet 102. An IP address is specified by a 32-bit host address usually represented in dotted decimal notation (e.g. 128.121.3.5). The IP address format is currently defined in Internet Standard (STD) 5, Request for Comments (RFC) 791 (Internet Architecture Board). Because of the 32-bit addressing scheme, only a total of $2^{32}$ (4,294,967,296) unique IP addresses are possible for the entire (i.e., global) Internet. Thus, Internet service providers 104 will assign each company or organization (and not each workstation 108) a single IP address or in some cases a small set of IP addresses.

Therefore, in order for users within an office 110 to access WWW servers, to use Telnet (the Internet standard protocol for remote login defined in STD 8, RFC 854), transfer files from different networks (via the File Transfer Protocol (FTP) defined in STD 9, RFC 959) and the like, IP addresses must correctly and uniquely identify the source and target of packets. More specifically, IP addresses allow packets transmitted within the IP to be datagrams-a self-contained, independent entity of data carrying sufficient information to be routed from the source to the destination computer without reliance on earlier exchanges or the transporting network.

Each office router 106 belonging to a company or organization often performs network address translation (NAT) or network address port translation (NAPT) to uniquely identify and distinguish the source and destination of transmitted datagrams among the plurality of workstations 108. Each stub router 106 executing NAT features allow an unregistered IP address to be used within a company and unique IP addresses to be used outside of the company. The necessity of including NAT features in the stub routers 106 purchased by individual corporations and organizations adds to these routers' cost. This can be a significant deterrent for a corporation or organization to grant Internet access to its employees from their individual workstations 108.

Therefore, what is needed is a system and method for network address translation and network address port translation as an external service in the access server of a service provider. Such access servers (e.g., routers) would reduce the cost of stub routers that individual companies and organizations must purchase.

SUMMARY OF THE INVENTION

The present invention is a system and method for network address translation as an external service in the access server of a service provider. The system is a novel service provider access server which performs network address translation (NAT) or network address port translation (NAPT) for local office networks (i.e., stub networks). This allows NAT and NAPT functionality and associated hardware to be removed from stub network routers thereby significantly reducing the cost of such routers. The method involves receiving a datagram from the Internet whose destination is a globally unique Internet Protocol (IP) address, mapping the globally unique IP address to a locally significant IP address and routing the datagram to a stub router located within a stub network. The method further includes receiving a second datagram from the stub router whose source is a locally significant IP address, mapping the locally significant IP address to a globally unique IP address, and then routing the second datagram to the Internet.

An advantage of the present invention is that the cost of stub routers is greatly reduced thereby reducing the burden of implementing an Internet infrastructure to individual companies and organizations.

Another advantage of the present invention is that it provides transparent routability for hosts in private networks, while providing for overall reduced cost of equipment and reconfigurations.

Another advantage of the present invention is that it allows for provider specific centralized translation mechanisms (i.e., NAT as an external service such that access clients will not be responsible for obtaining global addresses). Service providers can now determine the addresses specific to the needs of their clients.

Yet still, another advantage of the present invention is that it provides multi-protocol support such that external NAT support by service providers may be extended between routing realms running two different routing protocols such as IP v.6 and IP v.4; IPX and IP v.4; or Open Systems Interconnect (OSI) protocol and IP v.4.

Further features and advantages of the invention as well as the structure and operation of various embodiments of the invention are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION OF THE PREFERRED EMBODIMENTS

I. Introduction

The present invention relates to a system and method for network address translation as an external service in the access server of a service provider. In a preferred embodiment of the present invention, an Internet service provider employs a router which can perform network address translation for a plurality of its customers (i.e., corporations and/or organizations that each have their own local private networks). Network address translation (NAT) includes "basic NAT" for customers (e.g., companies, organizations, and the like) who are assigned a set of globally unique IP addresses and network address port translation (NAPT) for customers who are assigned only one globally unique IP address.

Service providers that employ the system and method of the present invention reduce the functionality needed in each of the local network routers (i.e., by providing NAT as an external service). The reduced functionality translates to reduced cost among all of the service provider's customers thereby eventually impacting (i.e., increasing) the potential number of people connected to the Internet.

The present invention is described in terms of the above example. This is for convenience only and is not intended to limit the application of the present invention. In fact, after reading the following description, it will be apparent to one skilled in the relevant art how to implement the following invention in alternative embodiments. For example, centralized network address translation need not be done on a router, but may be done externally at a central site box. It may also be done on the end host of an Internet service provider. Some service providers (especially those providing Internet or Enterprise access) utilize router software on an access server, while providing WWW content service or Simple Network Management Protocol(SNMP) management application on the same access server box. SNMP is the Internet standard protocol, used to manage and monitor various types of equipment defined in STD 15, RFC 1157, and developed to manage nodes on an IP network. SNMP is not limited to transmission control protocol (TCP)/IP.

II. Glossary

This section defines terms used throughout the remainder of this document. In the event that a term defined herein has a more common meaning or usage, the definition provided herein should be taken as the intended meaning.

Network Address Translation (NAT)—Network Addresses are used to identify network nodes for communication between nodes using a specific inter-connecting protocol. In particular, we refer to Internet Protocol (IP), version 4 in this document. These addresses are normally assigned by the Internet Assigned Numbers Authority (IANA) or service providers to ensure that the addresses assigned are globally unique when operating in the Internet domain. The basic requirement is simply that the addresses within a routing realm be unique across all the nodes in that networking domain.

Network Address Translation (NAT) refers to translation of network addresses and other higher layer identifiers (such as transmission control protocol (TCP)/user datagram protocol (UDP) ports) and related fields (such as checksum) in a datagram to be comparable to a routing realm, as a datagram traverses from one routing realm to another. NAT described in this document refers to datagrams (a.k.a. packets) traversing from a private address domain to a public address domain, both of which run the same IP v.4 network protocol. However, it is not uncommon to use NAT between routing realms running different routing protocols, (e.g., between IP v.6 and IP v.4, between IPX and IP v.4; between OSI and IP v.4, etc.) (of course, there would be protocol translations, in addition). It is also not uncommon to use NAT between routing realms running the same routing protocol (e.g., IP v.4) and even have globally unique addresses between the two routing realms combined. Load sharing application is an example of such an application. Network address translators provide transparent communication to hosts belonging to a stub domain of a routing realm.

Basic Network Address Translation—a.k.a. Basic NAT is a specific case of NAT in which a set of network addresses in one routing realm are mapped to a different set of network addresses in the routing realm connected by a basic NAT router. In Basic NAT, datagram modifications are limited to network addresses and related fields (such as a checksum).

Network Address Port Translation (NAPT)—NAPT is a specific case of NAT in which a set of network addresses in one routing realm are mapped to a single assigned address of the routing realm connected to by a NAPT router. NAPT is applicable only to transport protocols such as TCP/UDP (and to some extent Internet Control Message Protocol (ICMP)) that carry a transport layer specific identifier for sessions. In NAPT, datagram modifications are made to network addresses, transport layer identifiers (e.g., TCP/UDP ports) and related fields (such as checksums that are based on network addresses and transport identifiers).

Stub Domain—A network boundary in which all traffic that enters or leaves pertains to packets that either originate from the boundary or destined to a node in the boundary.

Border Router—A router that is at the edge of a stub domain network.

Service Provider—One that provides any computer/network related service. Internet Service Providers (ISPs) provide Internet access to their customers. One that provides Enterprise access to employees into the corporate site may be referred to as Enterprise Service Providers (ESPs). There are businesses that provide products and content (e.g., Web content) as a service. There are also businesses that provide a specific service such as Web hosting and network management service to enterprises. Clearly, these are all examples of service providers.

Router—A networking node that forwards packets not addressed to itself. Typically, a routing realm has a globally unique address space in that every networking node has one or more addresses uniquely different from that of every other node in the realm. A router typically has a forwarding table to forward packets based on the unique prefix they carry in the destination address.

Host—A networking node that does not forward packets that are not addressed to itself. A host is also considered the end point of packet communication.

Access Server—The term access server refers generically to a server that provides access to a service. As explained above, there are many types of service providers and thus their routers, end hosts and the like would provide NAT as an external service to the service provider's clients from a centralized location according to the present invention.

III. Overview of Present Invention

Figure 7:
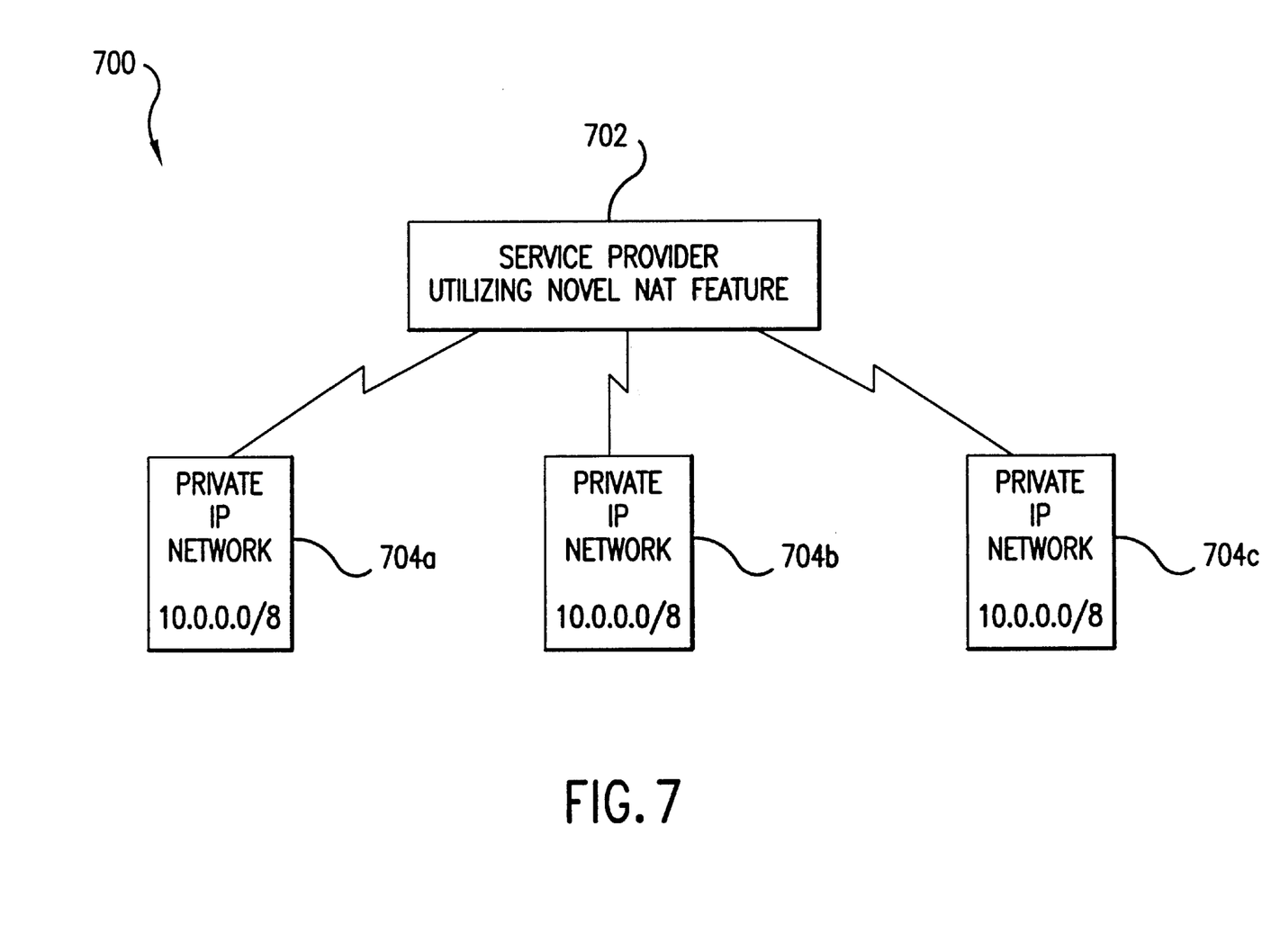
FIG. 7 is a block diagram of an exemplary environment in which the present invention may operate.

FIG. 7 is a diagram illustrating a typical environment 700 in which the present invention operates. A router typically forwards a packet directed to a host, by looking up the destination address (or the largest prefix that matches the destination address) in its forwarding table. For this reason, it is required that the address of each host within the routing realm be uniquely different from that of every other host in the same routing realm. However, an Access Server 702 utilizing this novel NAT feature (which may be referred to as a "Proxy NAT") is able to provide external routing access to nodes from multiple realms (shown as private IP networks 704a–c in FIG. 7), even as they bear the same address space. For example, the three WAN connections 704a–c have the same IP address space of 10.0.0.0/8. Of course, each of the private networks 704 would have to be independent stub domains which are not inter-connected.

Access Server 702 utilizing this novel proxy NAT feature is also able to provide Web content, SNMP management and other type of service to multiple routing realms represented by the same address space. Sections IV to VII below, with reference to FIGS. 2–5, respectively, show a preferred embodiment of the present invention where NAT or NAPT is done within an Internet Service Provider's router for customer's office networks. However, such an embodiment of the present invention is merely exemplary and not intended as exhaustive.

IV. Conventional Basic NAT

Figure 2:
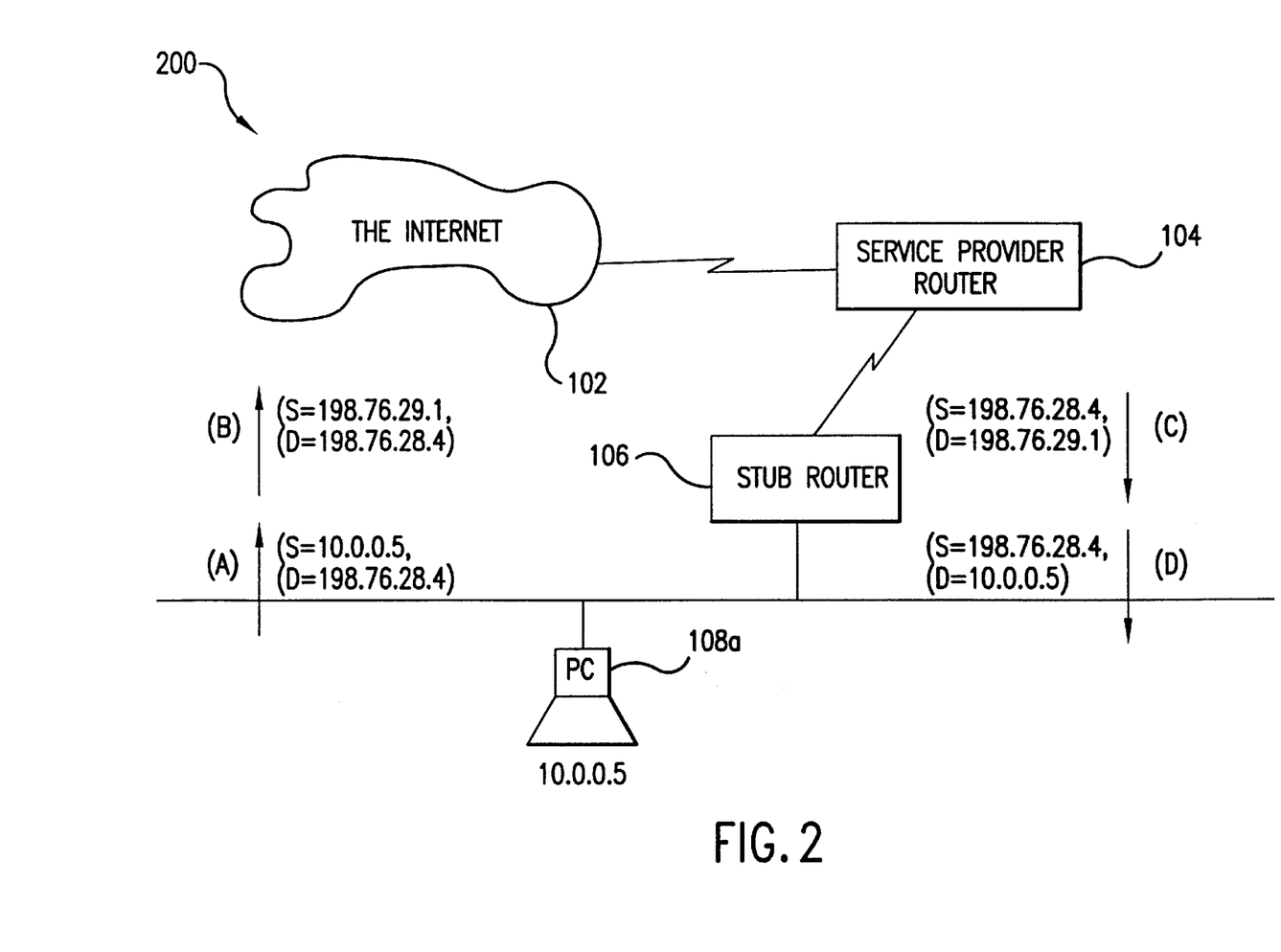
FIG. 2 is an illustration of basic network address translation according to the conventional method.

FIG. 2 illustrates the conventional method 200 for doing basic network address translation (NAT). That is, the following dataflow illustrates the NAT functionality that an individual organization's stub router 106 must possess when an organization's stub network 110 is assigned a set of globally unique IP addresses.

Each Personal computer (PC) 108 within the stub network is assigned an IP address which has only a local significance. If the number of PCS 108 is greater than the number of globally unique IP addresses assigned to the office 110, which is typically the case, there must be a mapping of the locally significant IP addresses to one of the globally unique IP addresses. If a user on PC 108a initiates an outbound session (e.g., a FTP, Telnet or any connection involving the exchange of datagrams), it transmits data with the source IP address of 10.0.0.5 (i.e., its own locally significant IP address) and a destination IP address of 198.76.28.4 (e.g., an IP address of a target host). This is shown by arrow (a) in FIG. 2. The stub router 106 maps (i.e., translates) the source IP address to one of the organization's available globally unique IP addresses (e.g., 198.76.29.1) before forwarding the packet to the service provider's router 104. This is shown by arrow (b).

If a reply should come back (i.e., inbound), it would contain a source IP address of 198.76.28.4 and a destination IP address of 198.76.29.1. This is shown by arrow (c). The office router 106 would then translate the destination IP address to 10.0.0.5 and forward the datagram to workstation 108a so that the original session (and thus user) on PC 108a can receive their reply. This is shown by arrow (d). As one skilled in the art will appreciate, the stub router 106 can correctly route subsequent reply datagrams (i.e., arrows (c)–(d)), through the address binding, lookup and translation phases of the particular NAT algorithm employed.

V. Novel NAT Model

Figure 3:
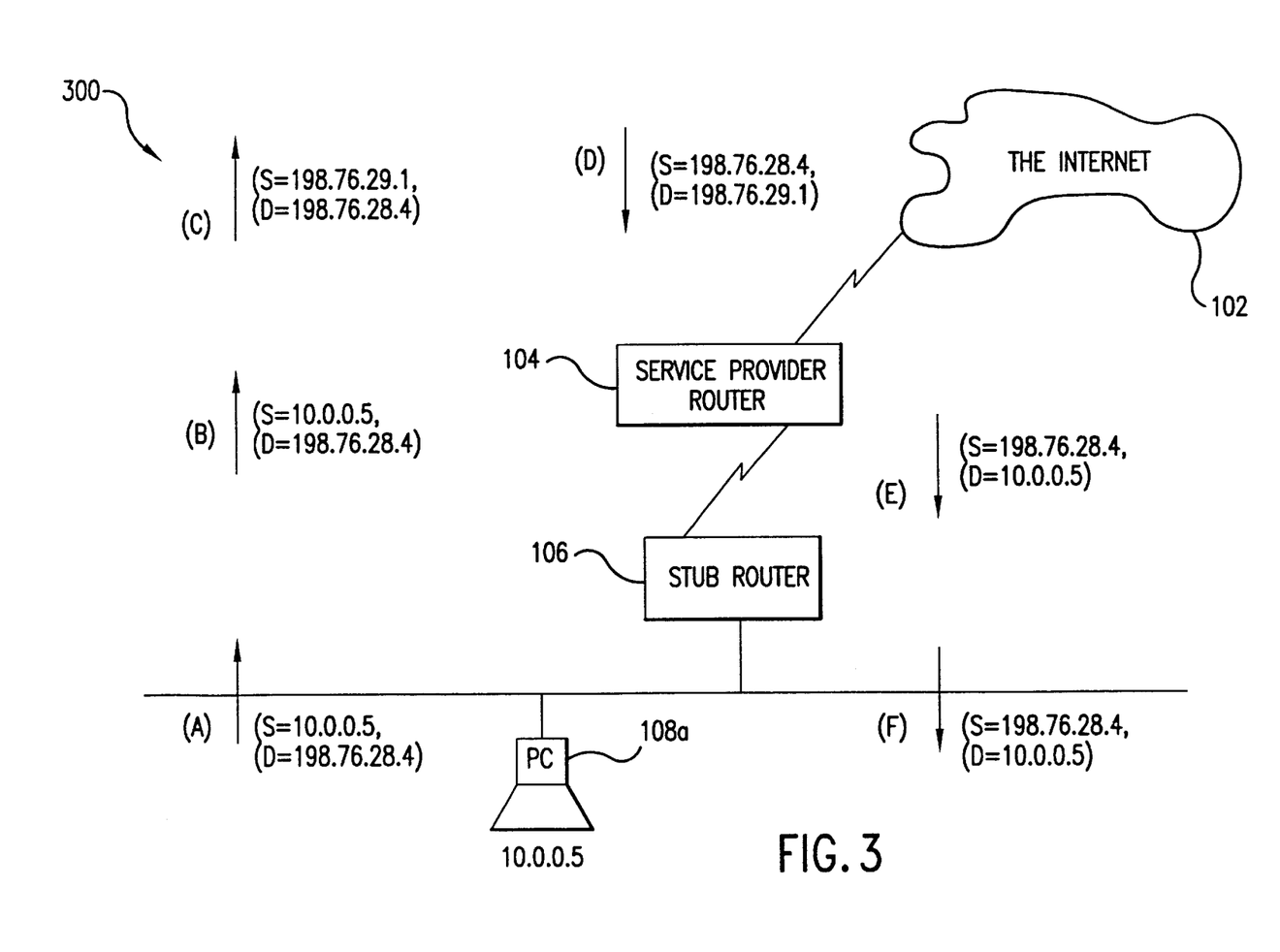
FIG. 3 is an illustration of basic network address translation according to the present invention.

FIG. 3 illustrates a basic NAT model 300 according to the present invention. If a user on PC 108a initiates an outbound session, it transmits a datagram with the source IP address of 10.0.0.5 (i.e, its own locally significant IP address) and destination IP address of 198.76.28.4 (e.g., an IP address assigned to another organization's stub network 110). This is shown by arrow (a) in FIG. 3.

The simplified stub router 106 (i.e., a stub router without any NAT functionality or hardware) simply forwards the datagram to the service provider's router 104. This is shown by arrow (b). The provider's router 104 maps the source IP address to one of the organization's available globally unique IP addresses (e.g., 198.76.29.1) before forwarding the packet to the Internet 102. This is shown by arrow (c).

If a reply should come back (i.e., inbound) it would contain a source IP address of 198.76.28.4 and a destination IP address of 198.76.29.1. This is shown by arrow (d). The provider's router 104 would then map the destination IP address to 10.0.0.5 and forward the datagram to the stub router 106. This is shown by arrow (e). The stub router 106 would then simply forward the datagram to PC 108a so that the original session (and thus user) can receive their reply. This is shown by arrow (f).

The above dataflow (arrows (a)–(f)) illustrates that basic NAT functionality, according to the present invention, is contained in service provider's router 104. In a preferred embodiment, the service provider's router 104 is a PM-3 or PM-4 router supplied by Lucent Technologies' Remote Access Business Unit (Pleasanton, Calif.). This allows the plurality of stub routers 106 within computing environment 100 to be without any NAT associated features (e.g., hardware, etc.). The NAT hardware is now only needed in the service provider's routers 104 which is a smaller number than stub routers 106 located at each organization or corporation's stub network 110. It will be apparent to one skilled in the relevant art that the proxy NAT feature uses a new packet forwarding scheme in conjunction with the forwarding scheme adapted by traditional routers, based on unique network forwarding table.

Furthermore, it will be apparent to one skilled in the art that the particular NAT algorithm employed (or even Internet Protocol version 6 as described in RFC 1550) will not effect the functionality of the present invention as described herein.

VI. Conventional NAPT

Figure 4:
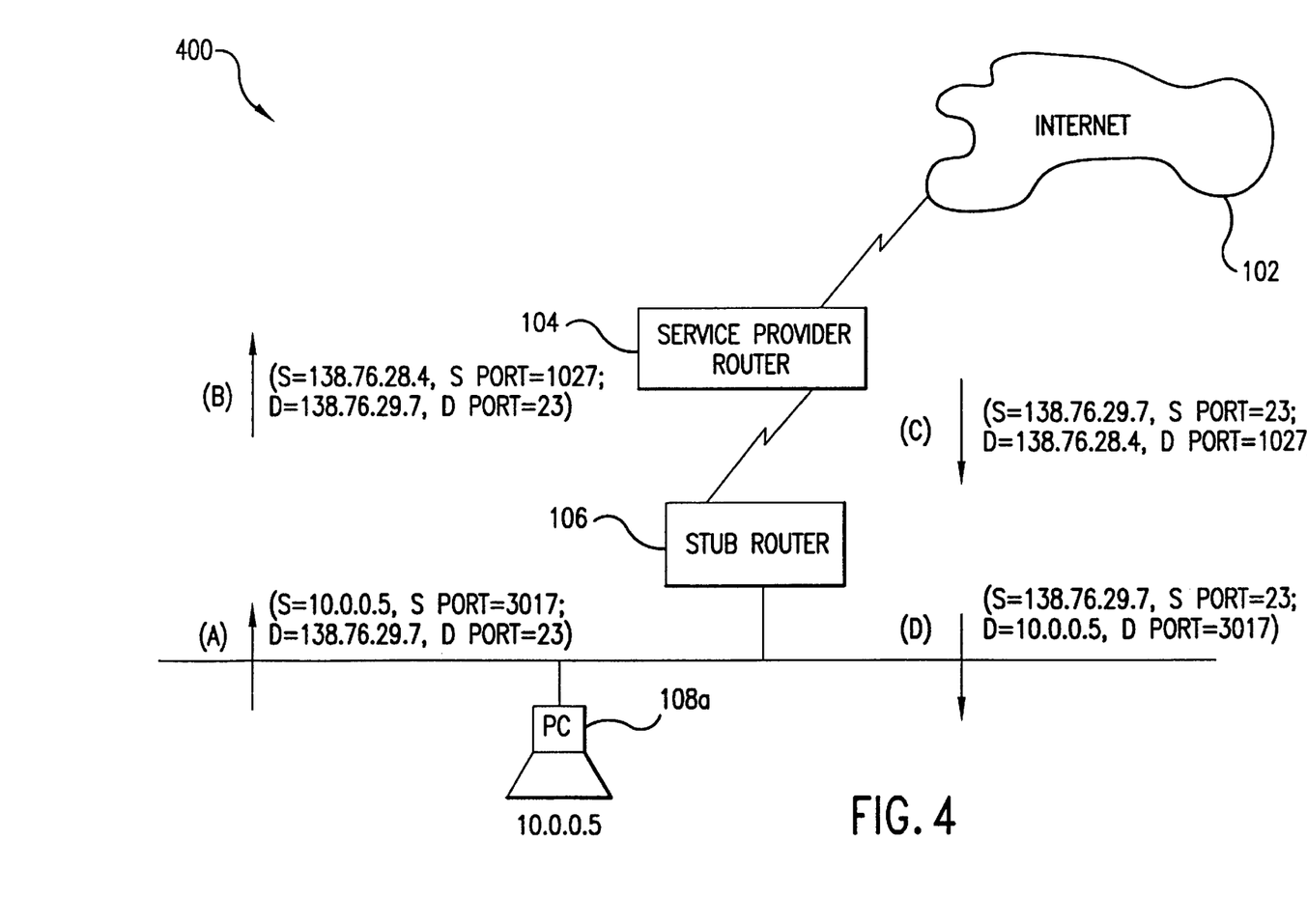
FIG. 4 is an illustration of network address port translation according to the conventional method.

FIG. 4 illustrates the conventional method for doing network address port translation (NAPT). That is, the following dataflow illustrates the NAPT functionality that an individual organization's stub router 106 must possess when an organization's stub network 110 is assigned only one globally unique IP address. Conventional NAPT algorithms and associated hardware allow many network locally significant addresses and their TCP/UDP ports to be translated to a single globally significant network address and its respective TCP/UDP ports.

For example, if a user on PC 108a initiates an outbound session (e.g., a FTP, Telnet or any connection involving the exchange of datagrams), it transmits data with the source IP address of 10.0.0.5 (i.e, it own locally significant IP address) and destination IP address of 138.76.29.7 (e.g., an IP address assigned to another target host). Also transmitted in the IP is the source port (e.g., 3017) and destination port (e.g., 23) of the datagram. This is shown by arrow (a) in FIG. 4. The stub router 106 maps (i.e., translates) the source IP address to the organization's single globally unique IP address of 138.76.28.4 before forwarding the packet to the service provider's router 104. Also, before forwarding the packet, the stub router 106 uniquely assigns the datagram to one of the ports (e.g., 1027) of the globally unique IP address. This is shown by arrow (b).

If a reply should come back (i.e., inbound) it would contain a source IP address of 138.76.29.7 and a destination IP address of 138.76.28.4. This is shown by arrow (c). The office router 106 would then map the destination IP address to 10.0.0.5, map the uniquely assigned port 1027 back to 3017, and then forward the datagram to workstation 108a so that the original session (and thus user) on PC 108a can receive their reply. This is shown by arrow (d).

It will be apparent to one skilled in the art that the TCP/UDP port specification in the IP header of datagrams correspond to a particular PC 108 or session (in the case of multiple sessions running on a PC 108) within stub network 110.

VII. Novel NAPT Model

NAPT currently performed at the stub router 106 level, as described above with reference to FIG. 4, is equally suitable to the implementation of the present invention. In other words, the NAPT functionality can also be done at the service provider's router 104 level as is illustrated in FIG. 5.

Figure 5:
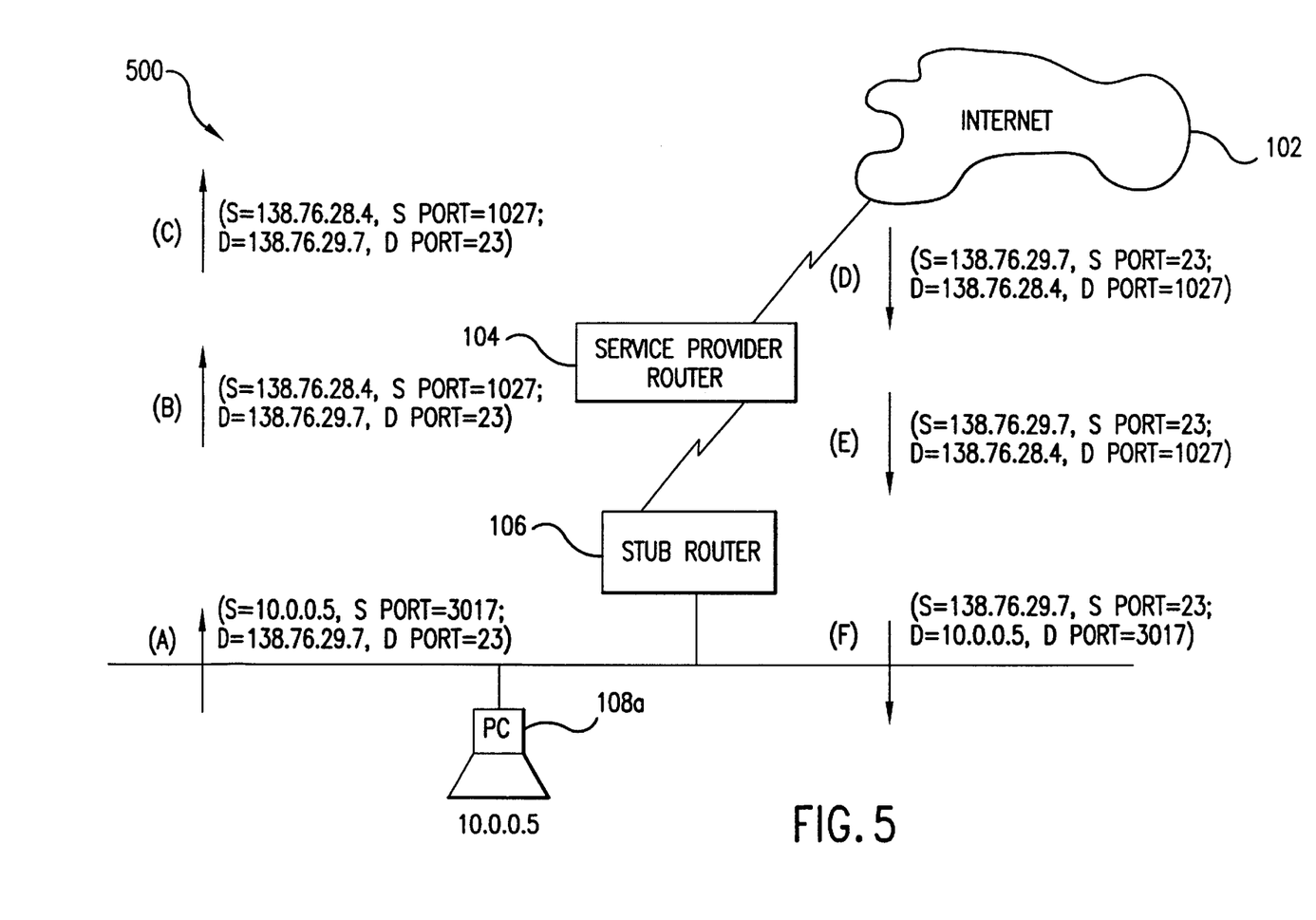
FIG. 5 is an illustration of network address port translation according to the present invention.

FIG. 5 illustrates a NAPT model 500 according to the present invention which operates in a similar manner to basic NAT method 300 (e.g., dataflow (a)–(f)). This achieves the same costs savings and advantages described above with respect to basic NAT. Furthermore, it will be apparent to one skilled in the art that the particular NAPT algorithm employed will not effect the functionality of the present invention as described herein.

VIII. Environment

Figure 6:
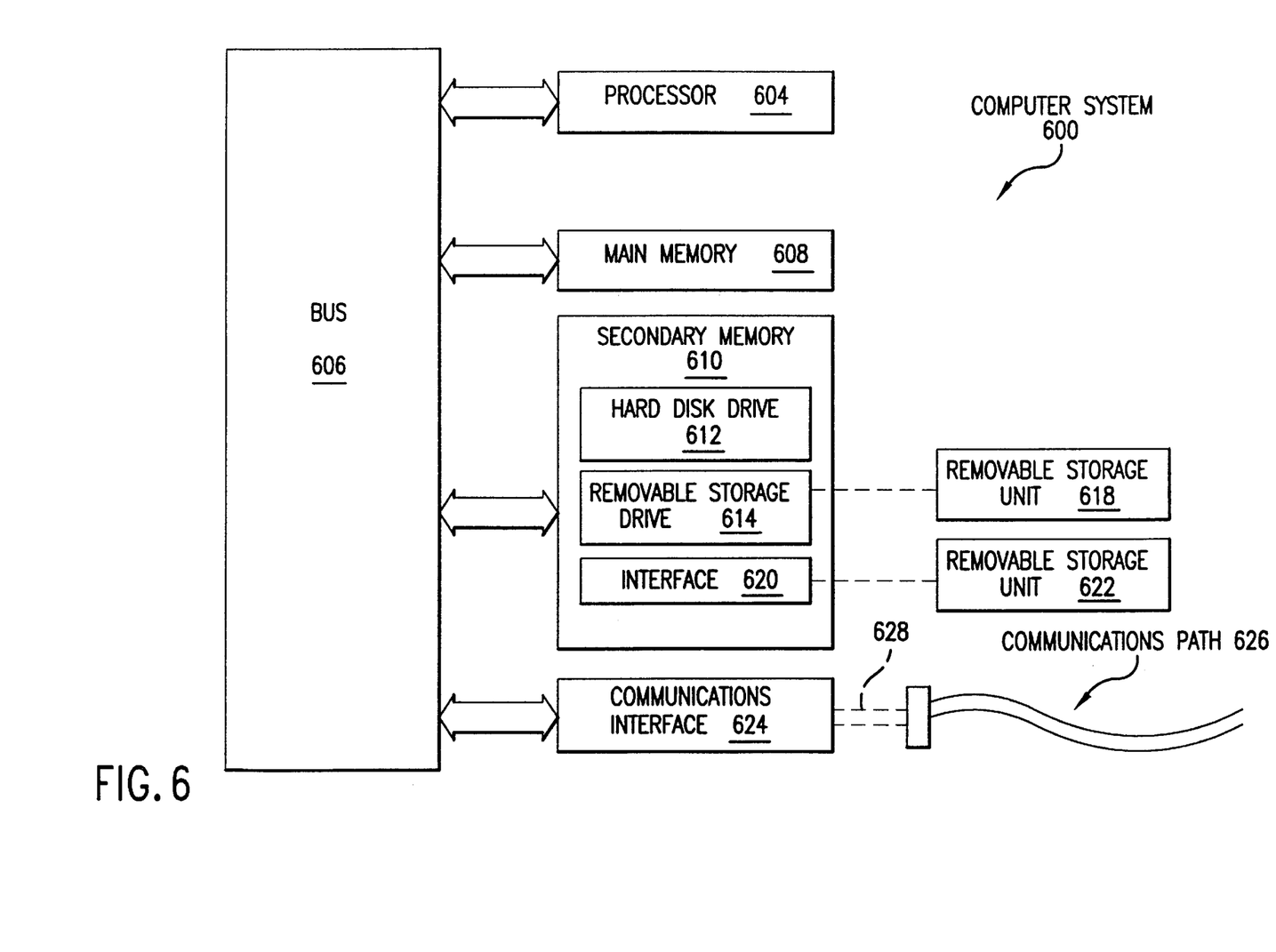
FIG. 6 is a block diagram of an exemplary computer system useful for implementing the present invention.

The present invention may be implemented using hardware, software or a combination thereof and may be implemented in a computer system or other processing system included within a service provider's access server. In fact, in one embodiment, the invention is directed toward a computer system capable of carrying out the functionality described herein. An example of a computer system 600 is shown in FIG. 6. The computer system 600 includes one or more processors, such as processor 604. The processor 604 is connected to a communication bus 606. Various software embodiments are described in terms of this example computer system. After reading this description, it will become apparent to a person skilled in the relevant art how to implement the invention using other computer systems and/or computer architectures.

Computer system 600 also includes a main memory 608, preferably random access memory (RAM), and can also include a secondary memory 610. The secondary memory 610 can include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618, represents a floppy disk, magnetic tape, optical disk, etc. which is read by and written to by removable storage drive 614. As will be appreciated, the removable storage unit 618 includes a computer usable storage medium having stored therein computer software and/or data.

In alternative embodiments, secondary memory 610 may include other similar means for allowing computer programs or other instructions to be loaded into computer system 600. Such means can include, for example, a removable storage unit 622 and an interface 620. Examples of such can include flash memory, a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 can also include a communications interface 624. Communications interface 624 allows software and data to be transferred between computer system 600 and external devices. Examples of communications interface 624 can include a modem, a network interface (such as an Ethernet card), a communications port, a PCM-CIA slot and card, etc. Software and data transferred via communications interface 624 are in the form of signals 628 which can be electronic, electromagnetic, optical or other signals capable of being received by communications interface 624. These signals 628 are provided to communications interface 624 via a communications path (i.e., channel) 626. This channel 626 carries signals 628 and can be implemented using wire or cable, fiber optics, a phone line, a cellular phone link, an RF link and other communications channels.

In this document, the terms "computer program medium" and "computer usable medium" are used to generally refer to media such as removable storage drive 614, a hard disk installed in hard disk drive 612, signals 628 and the like (e.g., flash memory). These computer program products are means for providing software to computer system 600.

Computer programs (also called computer control logic) are stored in main memory 608 and/or secondary memory 610. Computer programs can also be received via communications interface 624. Such computer programs, when executed, enable the computer system 600 to perform the features of the present invention as discussed herein. In particular, the computer programs, when executed, enable the processor 604 to perform the features of the present invention. Accordingly, such computer programs represent controllers of the computer system 600.

In an embodiment where the invention is implemented using software, the software may be stored in a computer program product and loaded into computer system 600 using removable storage drive 614, hard drive 612, communications interface 624 and the like (e.g., flash memory). The control logic (software), when executed by the processor 604, causes the processor 604 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

IX. Conclusion

In order for a service provider to perform basic NAT and NAPT for each of its customers (i.e., for each office 110), their access servers will have to be enabled to perform the address binding, lookup and translation, and unbinding phases of network address (port) translation. These modifications will be apparent to one skilled in the art.

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A system for network address translation within a router of an Internet service provider, comprising:

means for receiving a datagram from the Internet whose destination is specified by a globally unique Internet Protocol (IP) address;

means for mapping said globally unique IP address to a locally significant IP address; and means for routing said datagram to a stub router located in a stub network, wherein said stub network includes the destination specified by said locally significant IP address.

2. The system of claim 1, further comprising:

means for receiving a second datagram from said stub router located in said stub network whose source is said locally significant IP address;

means for mapping said locally significant IP address to said globally unique IP address; and means for routing said second datagram to the Internet.

3. The system of claim 2, wherein the router of the Internet service provider and said stub router each run a different routing protocol.

4. The system of claim 2, wherein said stub network is assigned a set of globally unique IP addresses and said first and second means for mapping comprises means for performing basic network address translation (NAT).

5. The system of claim 2, wherein said stub network is assigned one globally unique IP address and said first and second means for mapping comprises means for performing network address port translation (NAPT).

6. A computer program product comprising a computer usable medium having computer readable program code means embodied in said medium for causing an application program to execute on a computer that performs network address translation within an Internet service provider router, said computer readable program code means comprising:

a first computer readable program code means for causing the computer to receive a datagram from the Internet whose destination is specified by a globally unique Internet Protocol (IP) address;

a second computer readable program code means for causing the computer to map said globally unique IP address to a locally significant IP address; and a third computer readable program code means for causing the computer to route said datagram to a stub router located in a stub network, wherein said stub network includes the destination specified by said locally significant IP address.

7. The computer program product of claim 6, further comprising:

a fourth computer readable program code means for causing the computer to receive a second datagram from said stub router located in said stub network whose source is said locally significant IP address;

a fifth computer readable program code means for causing the computer to map said locally significant IP address to said globally unique IP address; and a sixth computer readable program code means for causing the computer to route said second datagram to the Internet.

8. A method for network address translation within a router of an Internet service provider, comprising the steps of:

(1) receiving a datagram from the Internet whose destination is specified by a globally unique Internet Protocol (IP) address;

(2) mapping said globally unique IP address to a locally significant IP address; and (3) routing said datagram to a stub router located in a stub network, wherein said stub network includes the destination specified by said locally significant IP address.

9. The method of claim 8, further comprising the steps of:

(4) receiving a second datagram from said stub router located in said stub network whose source is said locally significant IP address;

(5) mapping said locally significant IP address to said globally unique IP address; and (6) routing said second datagram to the Internet.

10. The method of claim 9, wherein the router of the Internet service provider and said stub router each run a different routing protocol.

11. A system for performing network address translation within the Internet, comprising:

a service provider access server; and an office network;

wherein said service provider access server performs network address translation (NAT) and network address port translation (NAPT) as an external service for said office network and wherein said office network comprises:

a plurality of computer workstations connected via a local network; and a stub router connected to said plurality of computer workstations via said local network.

12. The system of claim 11, wherein said service provider access server and said office network each run a different routing protocol.

* * * * *